APPARATUS FOR MEASURING SKEW IN A TAPE TRANSPORT

Filed July 23, 1965 2 Sheets-Sheet 1

RICHARD TOBEY,
ALAN K. JENNINGS
INVENTORS.

BY Leon D. Rosen
Albert Rosen
ATTORNEYS

RICHARD TOBEY,
ALAN K. JENNINGS,
INVENTORS.

BY Leon D. Rosen
Albert Rosen
ATTORNEYS 3,414,816
APPARATUS FOR MEASURING SKEW IN A TAPE TRANSPORT

Richard Tobey and Alan K. Jennings, Anaheim, Calif., assignors to Dartex, Inc., Anaheim, Calif.

Filed July 23, 1965, Ser. No. 474,252
2 Claims. (Cl. 324—83)

ABSTRACT OF THE DISCLOSURE

Apparatus for measuring skew in a tape transport, comprising a special tape having pulses recorded on two tracks extending along opposite edges of the tape and capable of being read by two laterally spaced heads. Each pulse from one track switches a binary signal to a positive level, while a pulse from the other track switches the binary signal to a negative level. The binary signal is passed through a low pass filter to a volt meter to measure the level of static skew. The binary signal is also passed through any one of several band-pass filters to a volt meter to determine dynamic skew at each band of frequencies.

This invention relates to devices for detecting the phase difference between signals and, while not limited thereby, relates more particularly to a device for indicating the skew of tape or other web material in a tape recorder or other web transporting mechanism.

In most industrial tape recording applications, for example, in data storage for computers, several parallel tracks of data are simultaneously recorded or read from a strip of magnetic tape by moving the tape past a recording head gap. Often the several tracks must be synchronized, as where each track carries one bit of a "data word," and all tracks are read simultaneously to yield the several bits of each complete data word. In order to assure synchronism, it is necessary that the tape move in a straight line which is normal to the recording head gap. This is to assure that the several bits of each data word, which are recorded on the several tracks, always move past the head gap simultaneously and are all read at the same time. When the tape is not guided in a straight line normal to the recording or read head gap, it is said to be "skewed." Excessive skew results in relative shifting of the several data tracks so that groups of simultaneously read bits are actually from different data words; such inaccuracy must be avoided.

The maximum skew possible in a tape transport generally limits the density with which data can be recorded. A skew or tilting of only one-tenth of one degree will shift one track relative to another on one-half inch wide tape by approximately one-thousandth of an inch and will prevent accurate reading of any information recorded at a density of 1000 bits per inch. Even a smaller degree of skew may make the processing of signals from the several tracks difficult. Accordingly, it is important to reduce or correct for skew as much as possible.

Skew arises from many causes. For example, if the read head gap is not positioned exactly perpendicular to the tape path, then a constant skew will result. If the capstan or a rotating guide element is not mounted with its axis exactly perpendicular to the tape path, or is of irregular shape or hardness, then a dynamic skew of the frequency of rotation of the improperly mounted or constructed element may occur. There are many other causes of skew which result in dynamic skew of a frequency related to the length and tension of the tape path and the weight and elasticity of the tape.

When skew is accurately measured in detail, it is often possible to minimize or correct for it. For example, external electronic means which place a relative delay in the output circuits of parallel data channels can be used to compensate for static skew. Tape transport elements such as the heads and guides can sometimes be adjusted to compensate for both static and dynamic skew. Accurate knowledge of skew also enables the determination of whether alignment of a tape transport is necessary, enables the measurement of the guiding capability of a transport, and aids in the design of transports for minimum skew.

It has been found especially useful, in measuring skew, to classify skew into static skew and dynamic skew, and the latter into various frequency bands. Measurement of these various components of skew is especially useful in determining the factors giving rise to skew, and in enabling its correction or compensation.

Various methods are available for measuring the skew of tape in a transport. One method is to record a series of regular flux changes along each of two parallel tracks on a length of tape, and to read this tape on the transport whose skew is to be measured. The output from one track is used to synchronize an oscilloscope, while the output from the other track is viewed on the oscilloscope, the viewed waveform appearing as a series of positive and negative pulses. If only static skew is present, then the displacement of the first pulse from the beginning of the oscilloscope trace indicates static skew. If dynamic skew is present then bands of pulses appear, the center of the band indicating static skew while the width of the band indicates maximum dynamic skew. While this method provides a general indication of skew characteristics, it does not provide an accurate indication because it is difficult to estimate the center and extremes of a band of jittering waveforms. Also, a few fleeting pulses which fall at the extremes of the bands are easily overlooked, yet they could represent the major cause of error in a system. Such a method does not provide a way to reliably estimate the time-varying rate, or frequency components, of the dynamic skew. Furthermore, the display inherently includes the effects of tape speed variations, which do not affect data accuracy since they affect all channels in the same way, and therefore such effects give rise to errors when included in the skew measurement; thus, the method causes more actual skew to be observed, while tape speed variations and skew are confused.

A more useful display can be provided by utilizing the outputs from the two tracks to generate an analog waveform, such as a ramp, whose amplitude is a function of the skew. This can be done by allowing the signal from one track to start a ramp and the other to reset it. The envelope of the ramps indicates maximum skew, the average ramp (height or length) indicates static skew, and the variation indicates dynamic skew.

A major disadvantage of the ramp-generating method is that skilled interpretation of the waveform is required to give meaningful results, and it is very difficult to determine the frequency components of the dynamic skew. Another disadvantage is that skew can be measured in one direction only, for example, only where one of the channels lags the other, but not when it leads. In many instances, skew rapidly varies in both directions (due to larger dynamic than static skew), yet the foregoing method provides an indication of skew in only one direction and ignores the other direction. Measurements of skew in both directions can be obtained by delaying one track sufficiently, but the time delay then necessitates the use of complex calibration procedures. Also, in the ramp generating method, variations in tape speed erroneously affect the skew measurement.

Accordingly, one object of the present invention is to provide an efficient means for measuring the phase difference between signals of approximately the same frequency.

Another object is to provide a means for easily measuring skew of tape-like material in a transport.

Another object is to provide an instrument for measuring both static skew and dynamic skew of various frequency ranges.

Yet another object is to provide a skew meter for readily indicating skew in either of the two opposite directions.

Still another object is to provide a skew meter for measuring skew independently of tape speed variations.

The foregoing and other objects are realized by an instrument which indicates skew by first measuring the time interval between the occurrence of pulse signals from two parallel tracks, and then automatically scaling this interval as a percentage of frame spacing (i.e. the time period between pulse signals from one track).

To use the instrument, a length of tape is obtained on which two data tracks have been recorded, each data track consisting of a series of pulses, and the two tracks being in phase. The tape is then played in the tape transport whose skew is to be measured. The read head of the tape transport yields a train of pulses for each data track, and the pulses, or their amplified equivalents, are delivered to the input terminals of the skew measuring instrument of this invention.

The instrument of the invention includes two flip-flop circuits, each triggered by one of the two data track outputs. The flip-flop generate a "square wave" of one-half the repetition rate of the pulses from the tape tracks. For small skews, the two square waves are nearly in phase or nearly 180 degrees out of phase. The instrument compares the first of the square waves with the second square wave or its complement. Logic circuitry is employed to generate a third phase-indicating square wave, or train of pulses, which alternates between zero and either a positive or a negative voltage. If the first square wave leads the second (or its complement, whichever is chosen) then the phase-indicating square wave is positive for only a short period of time and is zero most of the time, thus having a small positive average value. The average positive amplitude of the phase-indicating square wave is exactly proportional to the amount by which the first pulses lead the second pulses and, therefore, is proportional to the positive skew. When the first square wave lags the second (or its complement) by up to 90°, the phase-indicating square wave has a negative average amplitude exactly proportional to negative skew.

A low pass filter of low cut-off frequency connected to the phase-indicating square wave will yield a D.C. voltage proportional to the static skew, which can be directly read on a simple voltmeter movement. (Most D.C. meters indicate average amplitude and ignore high frequency components, so a separate low pass filter is usually unnecessary.) The phase-indicating square wave may also be observed on an oscilloscope to observe the variations in duration of the phase indicating pulses and their polarity, to indicated static and dynamic skew characteristics. If desired, a band-pass filter can be employed to directly indicate dynamic skew of a particular band of frequencies on a voltmeter type of movement.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
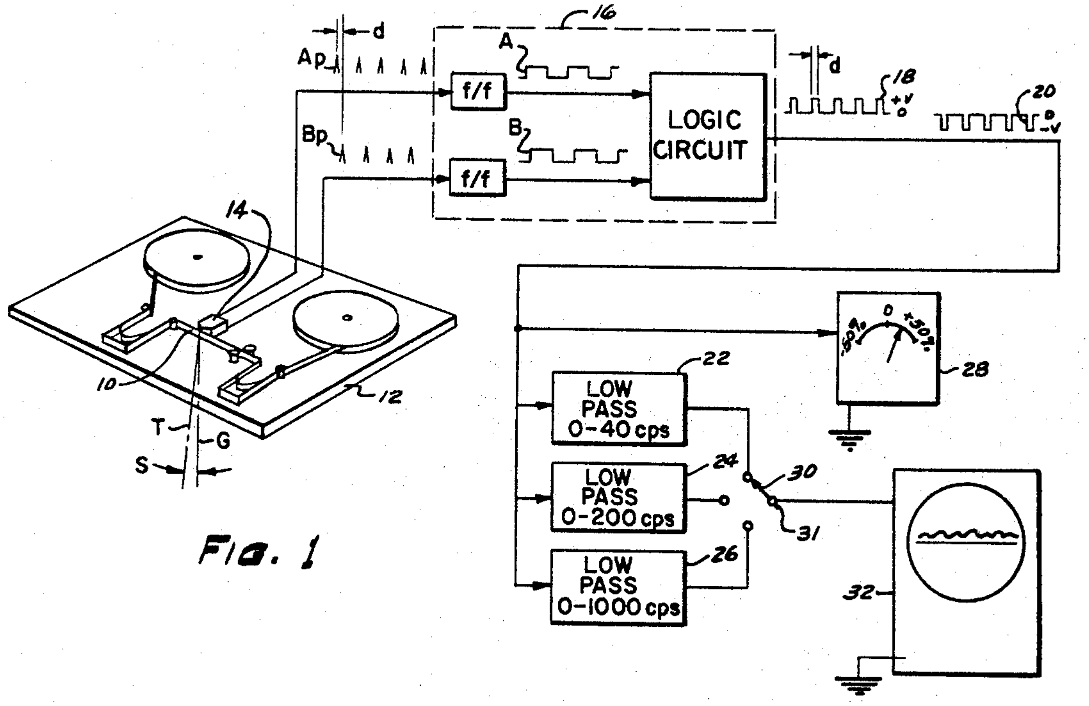
FIG. 1 is a simplified block diagram representation of a skew meter constructed according to the invention.

Reference is now made to the simplified block diagram of FIG. 1 which shows a skew meter constructed according to the invention, being employed to measure skew in a tape transport. Magnetic recording tape 10 is played or read in a tape transport 12 by moving the tape past a read head 14. The read head contains a narrow air gap and the tape ideally moves in a direction perpendicular to the gap. If the position of the tape, indicated by line T which is perpendicular to the length of the tape, is not normal to the read head air gap, which lies along the line G, then skew results, the angle of skew being indicated at S.

In accordance with the invention, skew of the tape transport 12 is measured by reading a specially recorded tape 10 on the transport. The tape contains two parallel data tracks located near opposite edges of the tape. A train of pulses has been recorded on each of the data tracks, the two trains of pulses being of the same frequency and of constant phase difference, preferably zero phase difference when run in a transport of zero skew.

When the tape 10 is read by the read head 14, which has a separate channel for each of the two tracks, two series of pulses $A_p$ and $B_p$ are obtained. If the pulses $A_p$ and $B_p$ are synchronized, there is no skew. If the pulses $A_p$ lead the pulses $B_p$ (by less than ½ the repetition period) then skew exists which we may arbitrarily denote as positive, and if $A_p$ lags $B_p$ there is negative skew. The skew meter of this invention includes initial processing circuitry 16 which produces a series of pulses as indicated by the pulses 18 and 20 which indicate the amount of skew and its polarity or lead-lag characteristic. The positive pulses 18 indicate that $A_p$ is leading $B_p$ (by less than ½ the repetition period), while negative pulses 20 indicate $A_p$ is lagging $B_p$. The duration $d$ of each pulse is equal to the smallest period of time between a pulse $A_p$ from one data track and a pulse $B_p$ from the other track. The pulses are shown as similar to a step voltage increase followed by a step voltage decrease or termination, although in practice the pulses may include overshoots, rise and fall times, and nonconstant amplitude during their periods of duration. These variations from the illustrated waveforms generally have no effect on accuracy of the measuring apparatus.

The duration $d$ of the pulses is the lead or lag time, and this period of duration divided by the period between successive pulses is the amount of skew, given as a fraction. The arithmetic average value of a pulse signal 18 or 20 over an entire repetition period is the amount of skew; this average is obtained by passing the signal 18 or 20 through a low pass filter. The meter 28 is actually connected to the circuitry 16 to receive the signals 18 or 20. By virtue of the slow response of the meter 28 which causes it to act as a low pass filter, the meter indicates the average or static value of skew together with slow variations thereof. The meter 28 normally reads at "0" when it receives no current. In the case of pulse trains of maximum width, i.e. where $d$ is equal to one-half the repetition period, the meter reads +50% or −50% skew, depending on whether the pulses are positive or negative. The meter is a dual polarity, direct current type, which enables the automatic simultaneous indication of both polarity and magnitude of skew.

Medium and high frequency components of the signals 18 and 20 indicate dynamic skew. These components are not indicated by the meter 28, but can be readily analyzed by display on an oscilloscope 32 or other alternating current measuring device. In the instrument of FIG. 1 three low pass filters 22, 24 and 26 are connected between the logic circuitry 16 and an oscilloscope terminal 31 to remove the very high frequency components of the pulse trains 18 and 20. The very high frequency components, primarily of the frequency of repetition of the pulses, are much higher than the highest frequency of dynamic skew likely to be present. A switch 30 connects the oscilloscope to the output of any one of the three filters. While filters with sharp frequency cut-off characteristics may be employed, it is usually possible to use simple low pass filters of much lower cut-off frequency than the pulses 18 or 20, such as only one twenty-fifth the frequency of the pulses. Thus, for a pulse repetition rate of more than 25,000 c.p.s., filter 26 having a pass band of 0 to 1000 c.p.s. may be selected. Filters 22 and 24 having pass bands of 0 to 40 c.p.s. and 0 to 200 c.p.s., respectively, may be used in connection with pulse trains of a repetition rate of more than 1000 c.p.s. and 5000 c.p.s., respectively. A narrow band of frequencies can be analyzed by employing a narrow band pass filter between the circuitry 16 and the oscilloscope 32.

Figure 5:
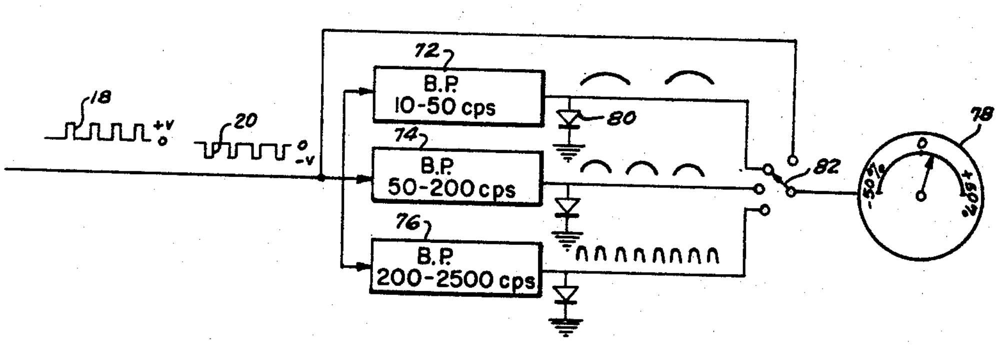
FIG. 5 is a partial simplified block diagram of an output circuit of a skew meter for indicating the amplitude of dynamic skew components directly on a voltmeter type of movement.

The dynamic skew components can be read directly on a numbered meter scale by employing band pass filters and rectifying the output before supplying it to a direct current meter, as shown in FIG. 5. In the figure, the pulse trains 18 or 20 are passed directly to the meter or through filters 72, 74 and 76 to obtain static skew and to obtain dynamic skew within three bands of frequencies. The meter 78 acts as a low pass filter so that the direct connection to the line carrying signals 18 or 20 yields a static skew reading on the meter. The band pass filter 72 passes that portion of signals 18 or 20 which indicate variations in pulse width occuring at a frequency of 10 to 50 c.p.s., which indicates dynamic skew of a frequency of 10 to 50 c.p.s. To enable the alternating current output of filter 72 to be read by the direct current meter 78, the output is rectified, as by a diode circuit 80. In a similar manner, the band pass filters 74 and 76 enable the indication of dynamic skew within the frequency bands of 50 to 200 c.p.s. and 200 to 2500 c.p.s., respectively. The "0" to "−50%" range of the meter 78 is used only in static skew measurements, while all dynamic skew registers on the "0" to "+50%" range. A switch 82 enables the connection of any one of the three filters or the unfiltered output, to the meter 78.

The skew indications of the meter 28 of FIG. 1 or the meter 78 of FIG. 5 are related to actual angle of skew in the tape transport, only through the special tape 10. If the pulses on the tape are recorded one-thousandth of an inch apart, and the two data tracks are a half-inch apart, then a skew reading of 50% indicates a tape skew of approximately 3 minutes or 0.05 degree.

Figure 2:
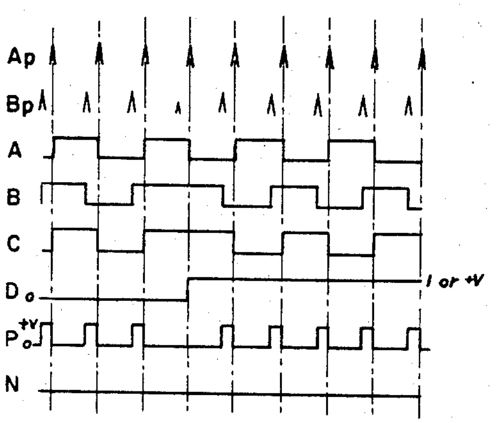
FIG. 2 is a representation of the signals in the circuit of the invention in the case of positive skew.

The initial processing circuitry, shown at 16 in FIG. 1, can be implemented by a circuit which generates signals of the type shown in FIGURE 2. In FIG. 2 the signals $A_p$ and $B_p$ are the pulses received from the read head. The fourth one of the $B_p$ pulses is of small magnitude and is not "recognized" as a pulse by the processing circuitry. Each of the pulse trains $A_p$ and $B_p$ is delivered to a flip-flop or bistable circuit, whereby each successive pulse changes the state of the flip-flop. The outputs of the flip-flops are the square waves A and B, each having a repetition rate of one-half the rate of the pulses $A_p$ and $B_p$, or i.e. a repetition period of twice the period between successive pulses $A_p$ and $B_p$.

The signals A and B are used to generate a phase matching signal C. The square wave C matches the state of B at the times that A changes; i.e. C is always in phase or 180° out of phase with A. The wave C is in phase with A when B leads A by an angle of between 0 and 180°, and C is 180° out of phase with A when B lags A by an angle of between 0 and 180°. (Of course, what polarity of the signal C is designated as matching A is arbitrary). The wave D is zero when A and B are no more than 90° out of phase (regardless of which leads or lags) and is +V or "1" when A and B are out of phase by more than 90°.

Figure 3:
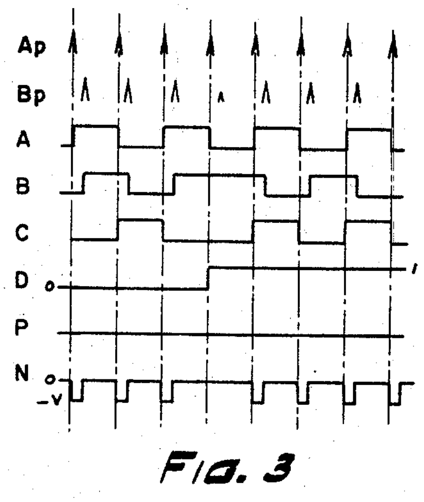
FIG. 3 is a representation of the signals in the circuit of the invention in the case of negative skew.

When $B_p$ leads $A_p$ (by less than ½ the repetition period of $A_p$ or $B_p$), as is the case in FIG. 2, the situation is herein referred to as positive skew and positive pulses P are generated; the duration of the pulses equals the amount of lead. When $B_p$ lags $A_p$, as is the case with the signals shown in FIG. 3, then negative pulses N are generated.

Once the signals A, B, C and D are available, the generation of P and N can be accomplished by simple logic circuitry. One set of logic functions which generates P and N is:

$$P=(AB'C+A'BC')D'+(ABC'+A'B'C)D \quad \text{Equation 1}$$

and $$N=(A'BC+AB'C')D'+(A'B'C'+ABC)D$$

Here P is a positive pulse occurring during the interval between occurrence of a pulse $B_p$ and occurence of a pulse $A_p$, for the case where pulses $B_p$ lead $A_p$ by less than one-half the repetition period of $A_p$ or $B_p$;

N is a negative pulse occurring during the interval between occurrence of a pulse $A_p$ and occurrence of a pulse $B_p$, for the case where pulses $A_p$ lead $B_p$ by less than one-half the repetition period of $A_p$ or $B_p$;

A is a square wave which changes level at each occurrence of a pulse $A_p$;

B is a square wave which changes level at each occurrence of a pulse $B_p$;

C is a square wave which matches the state of B whenever A changes state, and which thereafter remains at the same level at least until A changes state again; and D is a two level signal which is "one" when A and B are no more than 90° out of phase, and is "zero" when they are more than 90° out of phase.

Figures 4, 6A, 6B:
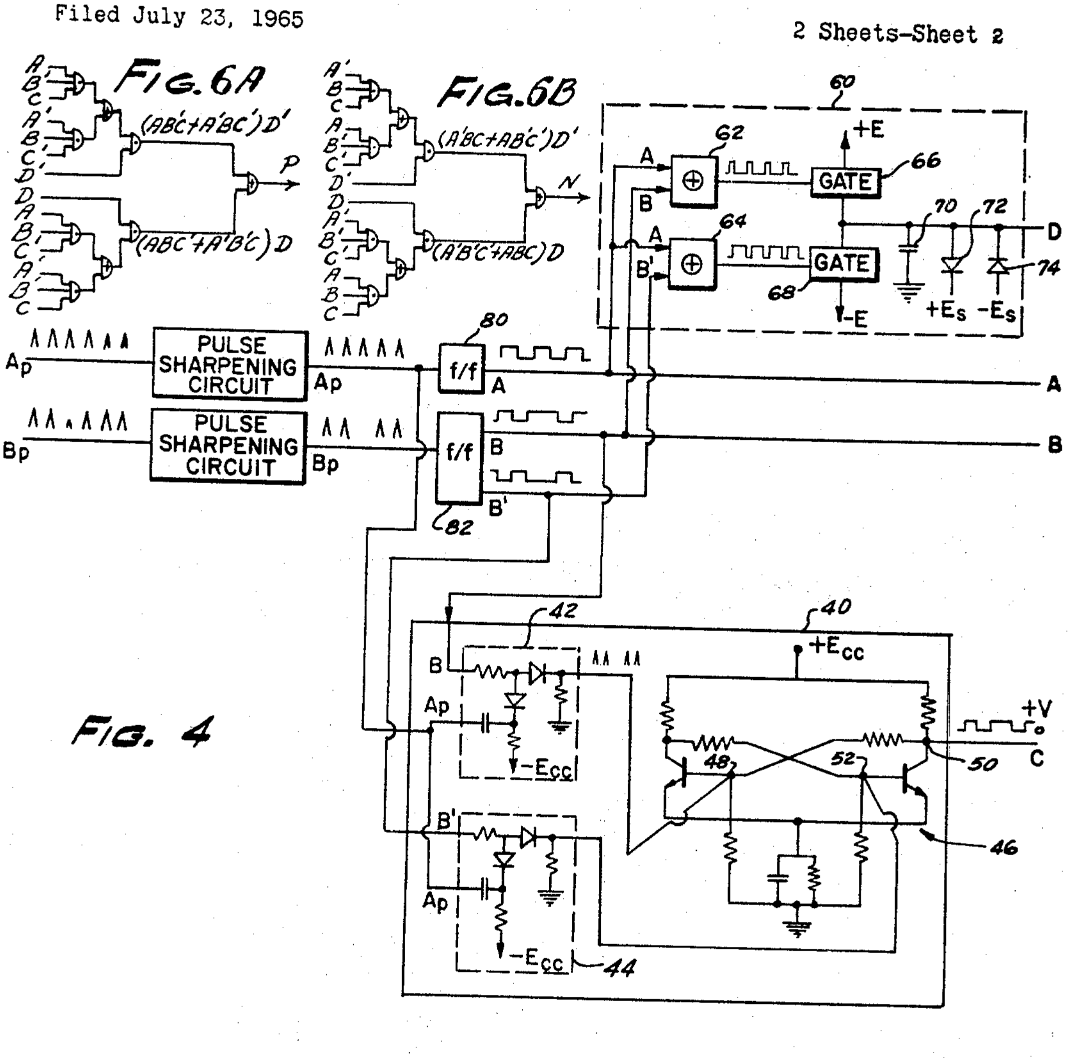
FIG. 4 is a block diagram of the invention showing circuitry for processing signals of the type shown in FIGURES 2 and 3.
FIGURES 6A and 6B are logic diagrams of circuits for providing positive and negative skew indicating signals.

Circuitry for implementing relatively simple logic equations are well known in the art and, therefore, will not be described. Circuitry for generating the signals C and D as defined hereinbefore are shown in FIG. 4. The generation of signal D may be accomplished by the circuit 60, which includes two "exclusive or" function generators 62 and 64 and means to compare their outputs. If A and B, which are derived from the flip-flops 80 and 82, are nearly in phase, there will be a short period of time during which only one of the signals A and B will be a "1," and the pulses from generator 62 will be narrow. Additionally, if A and B are nearly in phase there will be a long period of time during which only one of the signals A and B' (the complement of B) will be a "1," and the pulses from generator 64 will be very wide. The outputs of the two function generators control the gates 66 and 68. When gate 66 is on it allows a capacitor 70 to charge toward +E, and when gate 68 is on it allows the capacitor to charge toward —E. That gate which is on for the longest period of time will charge the capacitor toward its polarity after a few cycles or less. Diodes 72 and 74 are provided to limit the maximum capacitor voltages, so that such voltages can be rapidly attained. If A and B are less than 90° out of phase, the capacitor will charge to $-E_s$ and the signal D will be a "0." Conversely, if A and B are more than 90° out of phase, the capacitor 70 will charge to $+E_s$ and D will quickly become "1."

The generation of signal C is accomplished by the circuit 40 of FIG. 4 which comprises two gates 42 and 44 and a flip-flop or bistable multivibrator 46. The output 50 of the multivibrator 46 is the signal C. The gate 42 serves to pass the pulses $A_p$, which are then delivered to multivibrator input 48 to generate a C output of +V, or "1," but this occurs only when B is "1" at the time an $A_p$ pulse occurs. When B is "0," no pulse passes through the gate 42. Similarly, the gate 44 passes the pulses $A_p$ to multivibrator input 52 to generate a C output of zero, but this occurs only when B is "0." Thus, C changes state at every time that the square wave A changes, except when B changes from leading to lagging with respect to A.

The result is that a wave C which is synchronized with the wave A but which is of the same phase only if B is leading A, and is 180° out of phase if B is lagging A.

The logic circuitry required to generate P and N from the four signals A, B, C and D can be simplified by utilizing only alternate pulses. The logic equation then contains only one-half the terms of Equation 1. However, the utilization of alternate pulses requires additional filtering to remove ripple at the output, which results in a capability of detecting skew components of a maximum frequency only one-half as great.

While the invention is described for use in measuring the phase of two trains of short-duration pulses, it can be used to measure the phase relationship of a variety of repetitive signals. For example, two sine waves of the same frequency can be compared by allowing each sine wave to trigger a pulse-generating circuit when the sine wave increases beyond a predetermined amplitude. The two sets of pulses generated in this way may be compared by the phase measuring apparatus described hereinbefore.

Although particular embodiments of the invention have been described in detail, many other embodiments of the invention may be employed without departing from the spirit and scope of the claims which follow herein.

What is claimed is:

1. Apparatus for measuring skew in a tape transport by comparing the output from two heads that read signals on two laterally spaced tracks which carry repetitive signals of the same frequency, comprising:

first means responsive to the output of a first of said heads for generating a first binary output, A, synchronized with the output of said first head;

second means responsive to the output of a second of said heads for generating a binary output, B, synchronized with the output of said second head;

third means responsive to said first and second means for generating a third binary output, C, which changes level in synchronism with said first binary output to a binary level dependent upon the level of said second binary output;

fourth means responsive to said first and second means for generating a fourth signal, D, of a value dependent upon the angle by which said first and second signals are out of phase; and means responsive to said first, second, third, and fourth signals for indicating which of said readout signals is leading and the angle of lead.

2. Apparatus as defined in claim 1 wherein:

said means for indicating comprises means for generating binary pulses of a duration dependent upon the phase angle between said readout signals and means for indicating the component of said binary pulses lying within a predetermined frequency band, whereby to indicate the magnitude of skew components within said predetermined frequency band.

References Cited

UNITED STATES PATENTS

| | | |
|---|---|---|
| 2,751,439 | 6/1956 | Burton. |
| 3,079,522 | 2/1963 | McGarrell. |
| 2,193,812 | 7/1965 | Friend. |
| 3,205,438 | 9/1965 | Buck. |
| 3,211,993 | 10/1965 | Golden et al. |
| 3,366,876 | 1/1968 | Kurth et al. |

FOREIGN PATENTS

| | | |
|---|---|---|
| 1,179,634 | 10/1964 | Germany. |
| 211,331 | 11/1956 | Australia. |

OTHER REFERENCES

Peshel: "Wow and Flutter Compensation," Instruments & Control Systems, vol. 33, pp. 430–431, March 1960.

RUDOLPH V. ROLINEC, *Primary Examiner.*

P. F. WILLE, *Assistant Examiner.*